Oct. 11, 1927.
E. R. BERRY ET AL
METHOD AND APPARATUS FOR WORKING QUARTZ
Filed Sept. 20, 1923
Fig. 1.
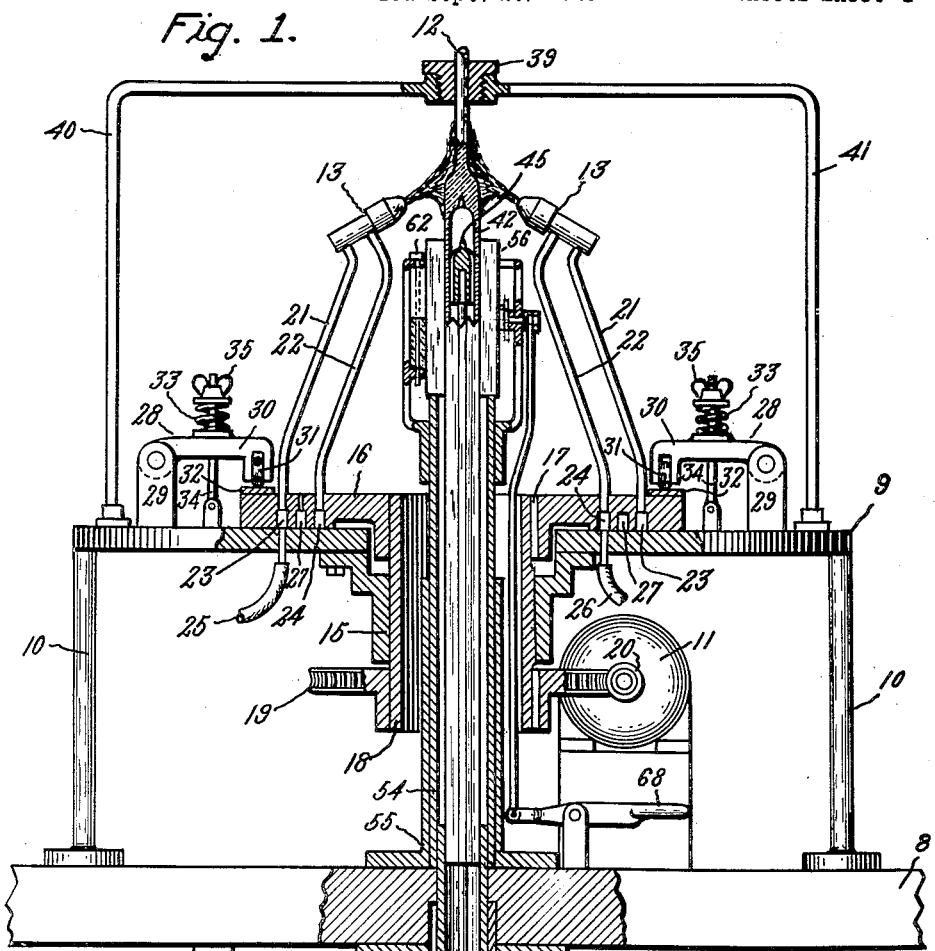
Fig. 4.
Fig. 5.
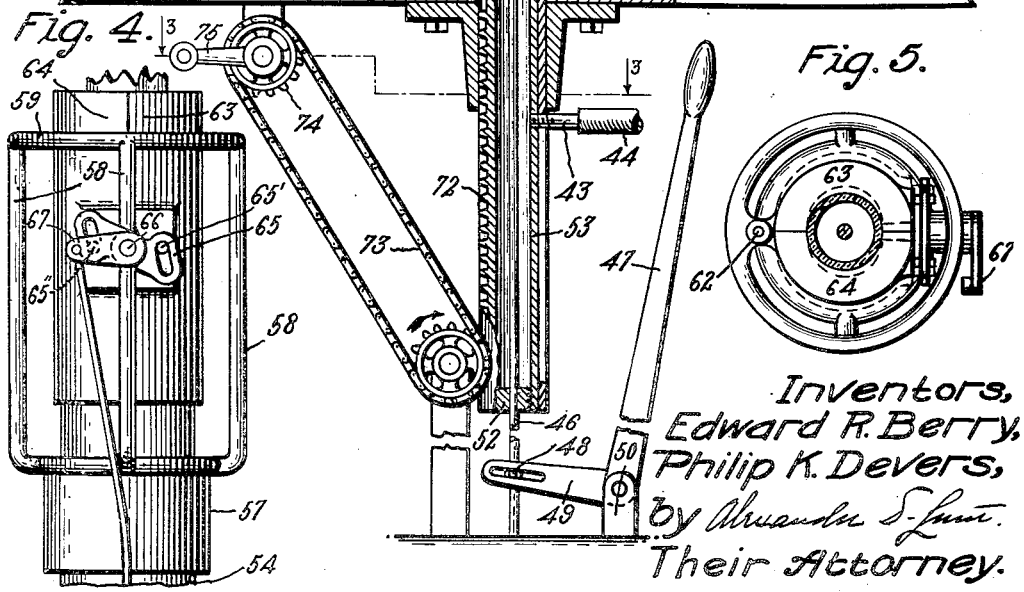
Inventors,
Edward R. Berry,
Philip K. Devers,
by Alexander S. Lunt
Their Attorney.

Oct. 11, 1927.  1,645,086
E. R. BERRY ET AL
METHOD AND APPARATUS FOR WORKING QUARTZ
Filed Sept. 20, 1923   2 Sheets-Sheet 2
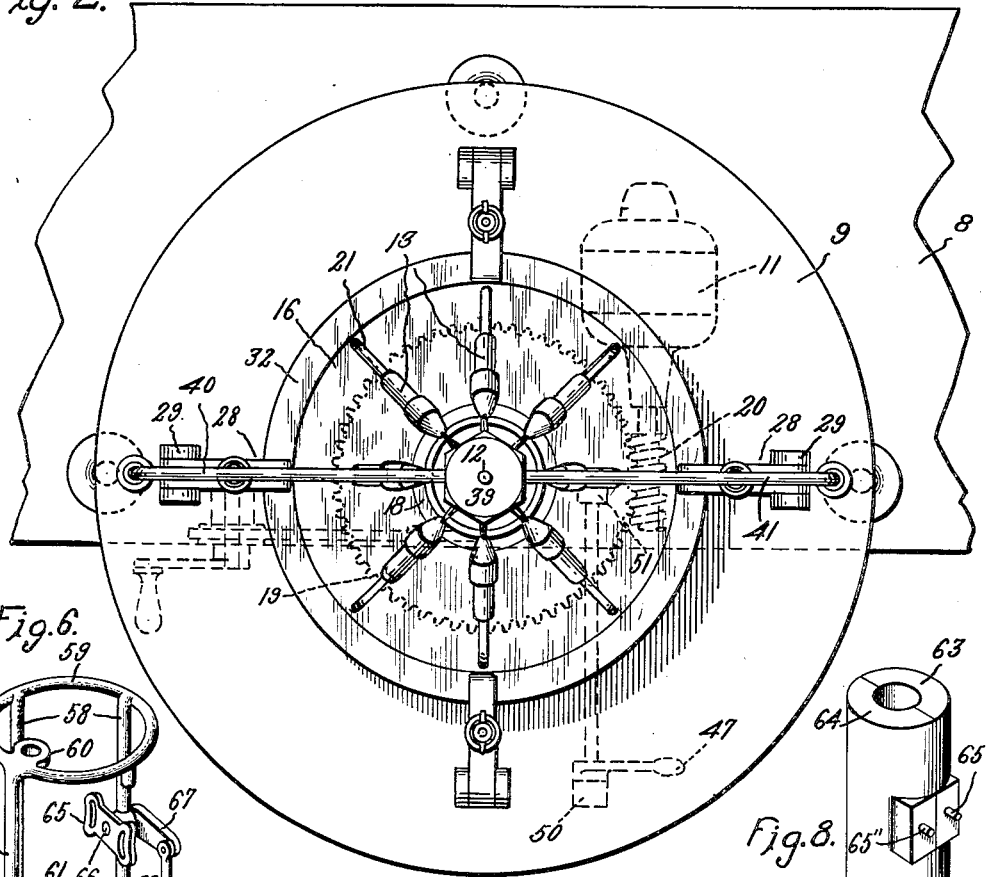
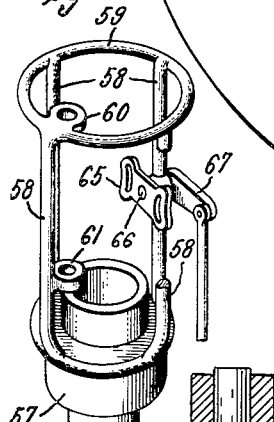
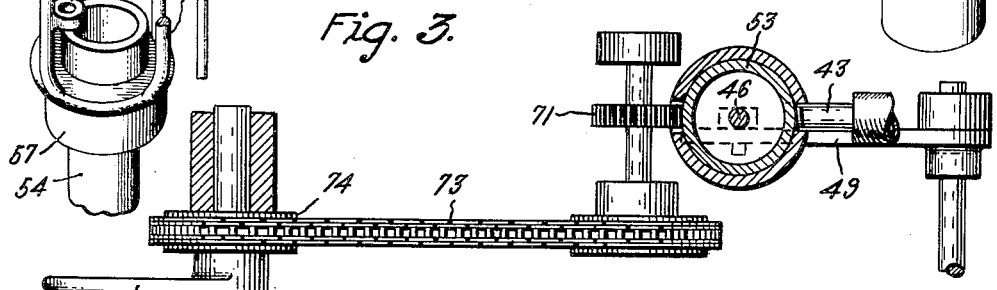
Inventors,
Edward R. Berry,
Philip K. Devers,
by
Their Attorney.

Patented Oct. 11, 1927.

1,645,086

UNITED STATES PATENT OFFICE.

EDWARD R. BERRY, OF MALDEN, AND PHILIP K. DEVERS, OF LYNN, MASSACHUSETTS, ASSIGNORS TO GENERAL ELECTRIC COMPANY, A CORPORATION OF NEW YORK.

METHOD AND APPARATUS FOR WORKING QUARTZ.

Application filed September 20, 1923. Serial No. 663,923.

The present invention relates to the manufacture of quartz tubing and it is the object of our invention to provide a method and apparatus for converting quartz or silica rods into tubular or other hollow form. Fused quartz hollow ware heretofore has been made by wrapping cane upon itself in helical form and then blowing the blank thus made into desired shape, or rough inferior quartz tubing is blown into desired finished form. In either case the lines of contact between the turns of the cane and the imperfections in the wall of the tubing persist in the finished article, and for many purposes prove detrimental. In our own process this feature is eliminated because cane of desired size can readily be made without flaws and the original surface is not broken to an appreciable extent.

In accordance with our invention a suitable elongated blank of silica or like vitreous material is fed into a heating zone where successive sections are heated to plasticity and expanded by internal pressure to tubular form. As a further but not essential part of our invention the resulting tube is shaped externally while it is still plastic. Our invention includes an apparatus suitable for carrying out the described process with a minimum of attention on the part of the operator. Our invention will be set forth with greater particularity in the appended claims.

The accompanying drawings illustrate one embodiment of our invention; Fig. 1 is a front elevation partly in section; Fig. 2 is a plan view of the apparatus as a whole; Fig. 3 is a plan view of a driving mechanism and other parts connected to the lower portion of our apparatus, being partly a section on lines 3—3 of Fig. 1; Fig. 4 is an elevational detail of an external shaping device; Fig. 5 is a plan view of said shaping device; and Figs. 6 to 8 are detail views of the same.

Referring first to Fig. 1, it will be observed that our device comprises a lower stationary part secured to a fixed base 8 and an upper rotatable part bearing on a platform 9 mounted by the vertical supports 10 upon the base 8 and being driven by a motor 11 as hereinafter described in detail. A quartz rod 12 (shown only in part) is fed into a heating zone constituted by the flames from a number of rotating gas burners 13, set around the quartz rod 12, as shown in Fig. 2. The rod 12 is expanded by gas pressure delivered by means of devices secured to the fixed part of the apparatus, and also is shaped externally by devices later described.

Rotatably mounted on the platform 9 is a disc 16 which is keyed at 17 to a sleeve 18. The latter rotates within a vertical cylindrical bearing 15 which is secured to the platform 9. Secured to the lower extremity of the sleeve 18 is a worm gear 19 which is connected by a worm 20 to the motor 11 (see Fig. 2). The burners 13 are mounted on the rotatable disc 16 by pipes 21, 22, communicating respectively with annular grooves 23, 24 formed in the disc 16. Coal gas and oxygen or hydrogen and oxygen are supplied to these respective grooves by flexible tubes 25, 26. A groove 27 between the grooves 23, 24 collects any combustible gas and oxygen that may leak from their respective grooves, and allows it to escape to the atmosphere by a vent as indicated to prevent dangerous accumulation of an explosive mixture.

To insure a gas-tight fit between the platform 9 and the rotating disc 16, resilient clamps 28 are provided which bear on the outer periphery of the disc 16. In Fig. 2 four clamps 28 are indicated but, of course, as many as desirable are used. Each of the clamps 28 consists of a support 29 mounted upon the platform 9, and a lever 30 secured pivotally to the support 29. A roller 31 upon the lever 30 is pressed into contact with a peripheral tread strip 32 by a spring 33 engaging with a clamping member 34. Wing nuts 35 permit adjustment of spring pressure.

The quartz cane, or rod 12, which is to be expanded into a tube is fed into the heating zone represented by the flames from the burners 13. In the drawing the upper part of the quartz rod is broken away. It is shown as passing through a movable apertured nut 39 held by the supports 40, 41, which are secured by the platform 9.

The quartz cane is thickened at its end by suitable manipulation when soft. At the beginning of the operation it is fused to a starting tube 42 which, if desired, can be made of an inferior grade of quartz. The rod 12 preferably consists of clear, substantially bubble-free quartz. Air or gas under pressure is supplied to the starting tube by tube 43 to which a flexible connection 44 is made in the usual manner.

At the beginning of the operation a spur or forming tool 45 is pushed into the softened interior surface of the thickened portion of the quartz to mechanically start the expansion of the rod into a tube. Preferably the spur 45 is provided with serrations or holes to permit air to pass into the space above the same. Although this spur may be hand operated it is conveniently linked by a rod 46 to a lever 47 by a pin 48 engaging with a slotted lever 49. When the hand lever 47 is rocked on its supports 50, 51 (Fig. 2) the rod 46 is pushed upwardly through the lug 52 at the bottom of a holding or feeding tube 53 upon which the starting tube 42 is mounted, thereby causing the spur 45 located within the quartz tube to enter the softened quartz rod as above stated. The air pressure in the interior of the softened cane expands the opening made by the spur into the tube. The holding tube 53 to which the starting quartz tube is attached extends upwardly into a tubular bearing 54, which is reinforced by a flanged tube 55 mounted upon the base 8. This construction prevents vibration of the moving parts.

External to and near the end of the quartz tube 42, a mold or shaping device is provided for shaping the exterior of the quartz as it is being formed into tubular shape. This shaping device to which the general designation 56 is given in Fig. 1, is shown in greater detail in Fig. 4. As shown in this figure the shaping device comprises a base sleeve 57 which is mounted upon the tube 54. Integral with this sleeve are four upwardly extending arms 58 tied together by ring 59, forming a stationary frame which is rigidly secured to the tube 54. Formed in the frame are the hinge supports 60, 61 through which a headed pin 62 (Fig. 5) may pass as a pivot for the two movable halves 63, 64 of the mold. These members 63, 64 of the mold consisting of graphite or other suitable material, may be swung apart by a slotted lever 65, which engages with the pins 65', 65'', upon the respective members of the mold as shown in Fig. 4. The lever 65 is supported upon one of the upwardly extending arms 58 by a shaft 66, upon which also is connected a crank 67. The mold parts may be manipulated by a hand lever 68 (Fig. 1) which is connected to the crank 67 as indicated.

Assuming the parts above described to be assembled and the quartz tube 42 to be held by the tube or sleeve 53 sufficiently tight to hold it in position and the quartz cane 12 to be held in proper alignment with the starting quartz tube by the nut guide 39, and also assuming that flames are projected on the fused quartz, as above described, then the operation of the apparatus will be as follows:

The disc 16 and the connected parts of the apparatus are rotated by the motor 11 until the zone of the quartz rod 12 upon which the flame plays is in a softened condition. The spur 45 is then forced upward into the quartz, thus forming a cavity which can be enlarged by the gas pressure within the tube. While the softened walls of the perforated end of the quartz rod 12 are being expanded by air pressure, the forming mold members 63, 64 are held in engagement by the hand lever 68 upon the outside of the quartz rod and the tube is blown to the size and shape of the interior of the mold. The mold thereupon is opened and the quartz tube and rod are lowered by the sprocket wheel 71 which engages with the gear rack 72 upon the tube 53. The sprocket wheel 71 is rotated by a chain 73 which engages with a sprocket wheel 74 driven by a crank 75 as indicated. An adjacent section of the quartz rod then is heated to the softening temperature and the operation is repeated successively along the length axis of the rod. Successive sections of the quartz rod thus are expanded to tubular form.

What we claim as new and desire to secure by patents of the United States, is:—

1. The method of converting a solid silica rod to tubing which consists in heating a portion of said rod to plasticity, forming a depression therein of materially lesser diameter than said rod, applying a gas under pressure to expand the softened portion into tubular form and then advancing the heating and expansion of said rod to an adjoining portion.

2. The method of making silica tubing which consists in heating a zone at one end of a silica glass rod to a softening temperature joining to the heated end of said rod a tube, then converting the heated zone of said rod into tubular form by internally applied pressure through said tube, and advancing the zone of heating on said rod while progressively converting the rod into a tube.

3. The method of converting a rod of vitreous material to tubular form of greater diameter which consists in heating a portion only of said rod to plasticity, perforating a portion of the plastic material along the longitudinal axis with a shaping device of materially lesser diameter, applying gas pressure internally to expand into tubular form the perforated portion of said rod and advancing the zone of heating and expansion of said rod.

4. The method of making silica tubing from silica cane which consists in rotating said cane, simultaneously applying sufficient heat to a section thereof to render the same plastic, longitudinally perforating a portion of said plastic section, applying gas pressure to expand the same, shaping the exterior of said expanding section and repeating said steps through the medium of the tube thus formed to shape the adjoining section of silica cane.

5. An apparatus for working quartz or the like comprising means for providing a heating zone, means for feeding a quartz rod into said zone, means for internally supplying pressure to said rod while heated to a plastic state to progressively expand said rod into tubular form.

6. A quartz working apparatus comprising means for heating an elongated solid quartz article to a softening temperature stepwise along its length, reciprocating means for piercing the interior of the successive heated zones of said article to form a tubular section, means for expanding said tubular section, an external mold for said tubular section, means for bringing said mold in and out of engagement with said tubular section, and means for supplying pressure to the interior of said tube during formation.

7. A quartz working apparatus comprising a plurality of radially located blowpipes, means for rotating said blowpipes, means for feeding a quartz rod into a heating zone provided by said blowpipes, means for perforating a portion of a softened quartz rod, means for supplying a gas under pressure to said perforated portion, and means for shaping the exterior of a quartz tube formed by the expansion of said quartz rod.

8. The method of making tubing of vitreous material from non-tubular stock of lesser diameter which consists in rendering a portion of said stock plastic, longitudinally perforating a part of said plastic portion, applying gaseous pressure to expand the perforated portion, shaping the exterior of the expanded portion and stepwise advancing the aforesaid heating and manipulating steps along said rod.

9. An apparatus for converting a rod of vitreous material into a hollow body of greater diameter which comprises means for heating to plasticity a portion of said rod, means for forming a cavity in the heated portion, means supplying a gas under pressure to said cavity for expanding the walls of said cavity and means for advancing said operations to successive portions of said rod.

10. The method of converting a silica rod to hollow form which consists in heating the end of said rod sufficiently to render the same plastic, inserting a forming tool into said plastic portion to produce a cavity, admitting gas under pressure to said cavity to expand the same, mechanically shaping the exterior of said expanded cavity, and progressively advancing the zone of heating and expansion.

In witness whereof, we have hereunto set our hands this 17th day of September, 1923.

EDWARD R. BERRY.
PHILIP K. DEVERS.